United States Patent

[11] 3,577,884

[72] Inventor Takashi Fujita
 Toyonaka-shi, Japan
[21] Appl. No. 749,045
[22] Filed July 31, 1968
[45] Patented May 11, 1971
[73] Assignee Matsushita Electric Industrial Co., Ltd.
 Osaka, Japan

[54] PRESSURE-MEASURING DEVICE
 2 Claims, 5 Drawing Figs.
[52] U.S. Cl. .................................................. 73/141A,
 338/47, 73/88.5SD
[51] Int. Cl. .................................................. G01l 1/20
[50] Field of Search .......................................... 73/88.5
 (S.D), 141; 338/2

[56] References Cited
 UNITED STATES PATENTS
2,497,770 2/1950 Hanson ........................ 73/88.5UX
3,132,408 5/1964 Pell .............................. 338/2
3,149,488 9/1964 Castro .......................... 73/88.5UX
3,343,076 9/1967 Ovshinsky .................... 338/2
 FOREIGN PATENTS
1,007,031 10/1965 Great Britain ................ 338/2

Primary Examiner—Charles A. Ruehl
Attorney—Stevens, Davis, Miller & Mosher

ABSTRACT: A pressure-measuring device employing a semiconductor element whose electric resistance is variable depending on a strain developed due to impartation of a pressure thereto so that a variation in the electric resistance of the semiconductor element due to an externally applied pressure can be detected by a meter thereby to measure the amount of pressure from the reading of the meter.

Patented May 11, 1971
3,577,884
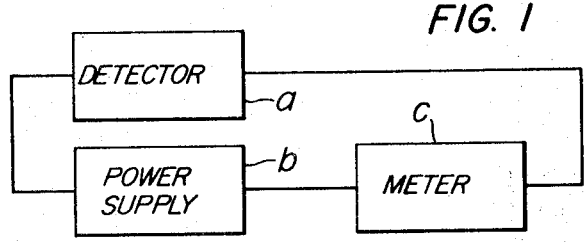
FIG. 1
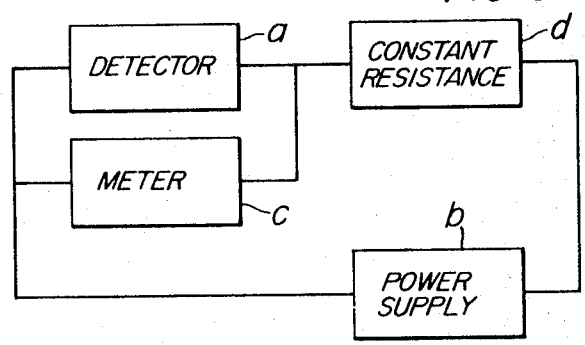
FIG. 2
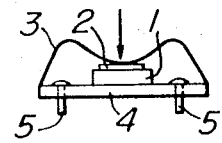
FIG. 3
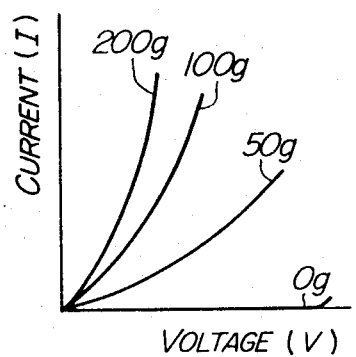
FIG. 4a
FIG. 4b
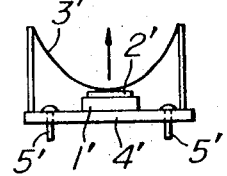
INVENTOR
TAKASHI FUJITA
BY Stevens, Davis, Miller & Mosher
ATTORNEYS

PRESSURE-MEASURING DEVICE

This invention relates to a pressure-measuring device.

Conventional pressure-measuring devices comprising a pressure-detecting section employing an elastic element such as a spring have been inconvenient in that an associated meter must be replaced depending on the weight of an article to be measured and have been defective in that precise measurement of a very small amount can not be attained due to poor sensitivity.

It is a primary object of the present invention to overcome the defect encountered with the conventional pressure-measuring devices and to provide a novel pressure-measuring device which employs a semiconductor element whose electric resistance value is variable depending on a strain developed due to impartation of a pressure thereto so that a variation in the electric resistance of the semiconductor element due to an externally applied pressure can simply be detected by a meter thereby to easily and precisely measure the weight of an article or pressure imparted thereby on the basis of the reading of the meter.

The above and other objects, features and advantages of the present invention will be apparent from the following description taken in conjunction with the accompanying drawings, in which:

FIG. 1 is a block diagram of an embodiment of the pressure-measuring device according to the present invention;

FIG. 2 is a block diagram of another embodiment according to the present invention;

FIG. 3 is a graphic illustration of the voltage-current characteristic of a semiconductor element employed in the device for the pressure detection;

FIG. 4a is a schematic vertical sectional view of one form of the pressure detector employing the semiconductor element therein; and FIG. 4b is a schematic vertical sectional view of another form of the pressure detector employing the semiconductor element therein.

Referring to FIG. 1 showing an embodiment of the present invention, the pressure-measuring device comprises a detector $a$, a power supply $b$ and a meter $c$, which are connected in series with each other. The detector $a$ may have a structure as shown in FIG. 4a. In FIG. 4a, the detector $a$ comprises a semiconductor element 1 which, when subject to a pressure imparted by the weight of an article to be measured, undergoes a variation in the internal resistance thereof as a result of development of a strain which is dependent upon the applied pressure. The semiconductor element 1 is made by diffusing into an N-type silicon substrate an impurity such as copper which forms a deep energy level within the semiconductor. Gold containing 0.8 percent by weight antimony is alloyed to one of the surfaces of the semiconductor element 1 to provide one electrode 2, while a metal layer is brought into ohmic contact with the opposite surface of the element 1 to provide the other electrode. The semiconductor element 1 is covered by a cover member 3 of elastic material which is centrally concaved to lightly contact the electrode 2 of the semiconductor element 1 in such a relation that no pressure is thereby imparted to the semiconductor element 1. The semiconductor element 1 is mounted on a baseplate 4, and a pair of pins 5 extend through the baseplate 4 to provide necessary electrical connection with the electrodes by way of leads.

When a pressure is imparted in a direction of the arrow as shown in FIG. 4a, the electrode 2 of the semiconductor element 1 is pressed by the concave portion of the cover member 3, with the result that the semiconductor element 1 is subject to a strain and a reduction in the electric resistance takes place. The semiconductor element 1 has a voltage-current characteristic as shown in FIG. 3 in which it will be seen that an increased current flows across the electrodes due to the reduction in the electric resistance with an increase in the pressure imparted to the element 1.

In another form of the detector $a$ as shown in FIG. 4b, the detector comprises a semiconductor element 1' having an elasticity, an electrode 2', another electrode (not shown), a cover member 3' of elastic material, a baseplate 4' for mounting thereon the semiconductor element 1', and a pair of pins 5' for providing a necessary electrical connection with the electrodes by way of leads. In FIG. 4b, the cover member 3' is secured to the baseplate 4' in such a relation that a pressure is normally imparted to the semiconductor element 1', which has therefore a low resistance in such a state. When now a force is applied in a direction of the arrow as shown in FIG. 4b, this force counteracts the pressure normally imparted to the semiconductor element 1' by the cover member 3', and as a result, the pressure imparted to the semiconductor element 1' is reduced and the resistance of the semiconductor element 1' is thereby increased.

In FIG. 1, the detector $a$ has thus the means including the semiconductor element described above, the power supply $b$ is a DC power supply, and the meter $c$ is an ammeter provided with means for zero adjustment. In the measurement of the weight of an article with the system shown in FIG. 1, the amount of current supplied from the power supply $b$ in response to a variation in the resistance of the semiconductor element 1 in the detector $a$ depending upon the weight of the article can be read on the ammeter $c$ to know the weight of the article.

Another embodiment of the pressure-measuring device of the present invention as shown in FIG. 2 comprises a detector $a$ similar to that shown in FIG. 1, a DC power supply $b$, a meter $c$ which is an ammeter provided with means for zero adjustment, and a constant resistance $d$. The system shown in FIG. 2 differs from that shown in FIG. 1 in that a parallel circuit of the meter $c$ and the detector $a$ is connected in series with the power supply $b$ and the constant resistance $d$, so that a variation in the resistance of the semiconductor element in the detector $a$ gives rise to a variation in the amount of current supplied from the power supply $b$ and a resultant variation in the voltage distribution across the detector $a$ and the constant resistance $d$.

In the measurement of the weight of an article with the system shown in FIG. 2, a voltage across the detector $a$ is read on the ammeter $c$ to know the weight of the article.

It will be appreciated that the semiconductor element employed in the pressure-measuring device according to the present invention has a very high sensitivity and such an electrical characteristic which varies greatly in a low-pressure range and slightly in a high-pressure range so that measurement over a wide range can be taken with an error of substantially the same degree. Furthermore, the capability of directly converting a mechanical pressure into an electrical signal permits ready combination of the system with an amplifier. Moreover, the device can measure a very small amount with high precision and thus finds valuable applications in various fields of industry.

I claim:

1. A pressure-measuring circuit device consisting of a series combination of a DC power supply, an ammeter and a pressure detector which comprises an N-type silicon wafer element doped with copper which forms a deep energy level therein, a flat gold electrode containing 0.8 percent antimony by weight alloyed on one side surface of said element, a baseplate, a metal layer electrode on said baseplate and in ohmic contact with the other surface of said element, two terminal pins connected by leads with said electrodes for completing said circuit and a saddle-shaped cover member of an elastic material having a central concave portion in light contact with the outer surface of said gold electrode, whereby the application of an external pressure on said concave portion causes said element to register a corresponding indication on said ammeter due to a change in the internal resistance of said element between said electrodes in response to said external pressure.

2. A pressure-measuring circuit device consisting of a DC power supply, an ammeter and a pressure detector which comprises a semiconductor wafer element of an elastic property doped with an impurity forming a deep energy level therein, a flat gold electrode containing 0.8 percent antimony by weight alloyed on one side surface of said element, a baseplate, a metal layer electrode on said baseplate and in ohmic contact with the other surface of said element, two terminal pins connected by leads with said electrodes for completing said circuit and an arch-shaped cover member of an elastic material having a central concave portion in contact with the outer surface of said gold electrode, said cover member being such that an external pressure exerted thereon may correspondingly release the compression force imparted thereto from said concave portion so as to give a corresponding indication of the measurement on said ammeter due to a change in the internal resistance of said element between said electrodes brought about in response to said external pressure.